INVENTOR.
ABRAHAM KATZ
BY Morris A. Rabkin
ATTORNEY

INVENTOR.
ABRAHAM KATZ
BY Morris [signature]
ATTORNEY

3,008,129
MEMORY SYSTEMS

Abraham Katz, Haddonfield, N.J., assignor to Radio Corporation of America, a corporation of Delaware Filed July 18, 1956, Ser. No. 598,689
8 Claims. (Cl. 340—174)

This invention relates to memory systems, and particularly to memory systems using storage elements which have a plurality of stable states.

Multi-dimensional arrays of storage elements are used for storing digital information. For example, a three-dimensional memory system using magentic cores is described in an article by William N. Papian, entitled "New Ferrite-Core Memory Uses Pulse Transformers," published in the March 1955 issue of Electronics. As another example, a two-dimensional memory system using ferroelectric storage elements is described in an article by C. F. Pulvari, entitled "Ferroelectrics and Their Memory Applications," published in the March 1956 issue of the IRE Transactions on Component Parts. In such memory systems, binary information is stored by applying suitable excitations to establish desired ones of the elements in desired ones of their remanent states. The two binary digits "1" and "0" are respectively represented by two of the remanent states of an element. The stored information is read out of the desired elements by applying suitable excitations to change all of the desired elements to a predetermined one of these two states, and observing the signals produced in separate output circuits coupled to the desired elements. A relatively large output signal is produced when an element is changed from its other to the one state, and a relatively small output signal is produced when the element is already in the one state. Note that some signal, either relatively large or relatively small, is always produced in an output circuit. In practice, however, this output signal actually may represent incorrect information. For example, due to some failure of the addressing circuitry, an element intended to be changed to the one state may remain in its other state, or vice versa. Thus, during a subsequent reading operation, the signals produced in the output circuits represent incorrect information. This type of error is difficult to detect because the circuit failure may be transitory in nature and because certain of the auxiliary equipment is common to different groups of storage elements.

It is an object of the present invention to provide an improved memory system using multi-stable storage elements which system has means for monitoring the information written into the storage elements.

Another object of the present invention is to provide an improved memory system which is more reliable than memory systems heretofore provided.

A further object of the present invention is to provide an improved memory system having means for detecting when incorrect information is written into the storage elements.

According to the invention, a memory system includes means for monitoring the information actually written into the storage elements. The monitoring means includes circuitry responsive to the change of state of a memory element to produce a signal in the output circuit of the element. The output signals produced in the output circuits, and representing the information actually written into the memory elements, are supplied to a comparator unit and are there compared with the information applied to the memory elements. The comparator furnishes a positive indication of the equality or non-equality of the compared information.

Figure 1:
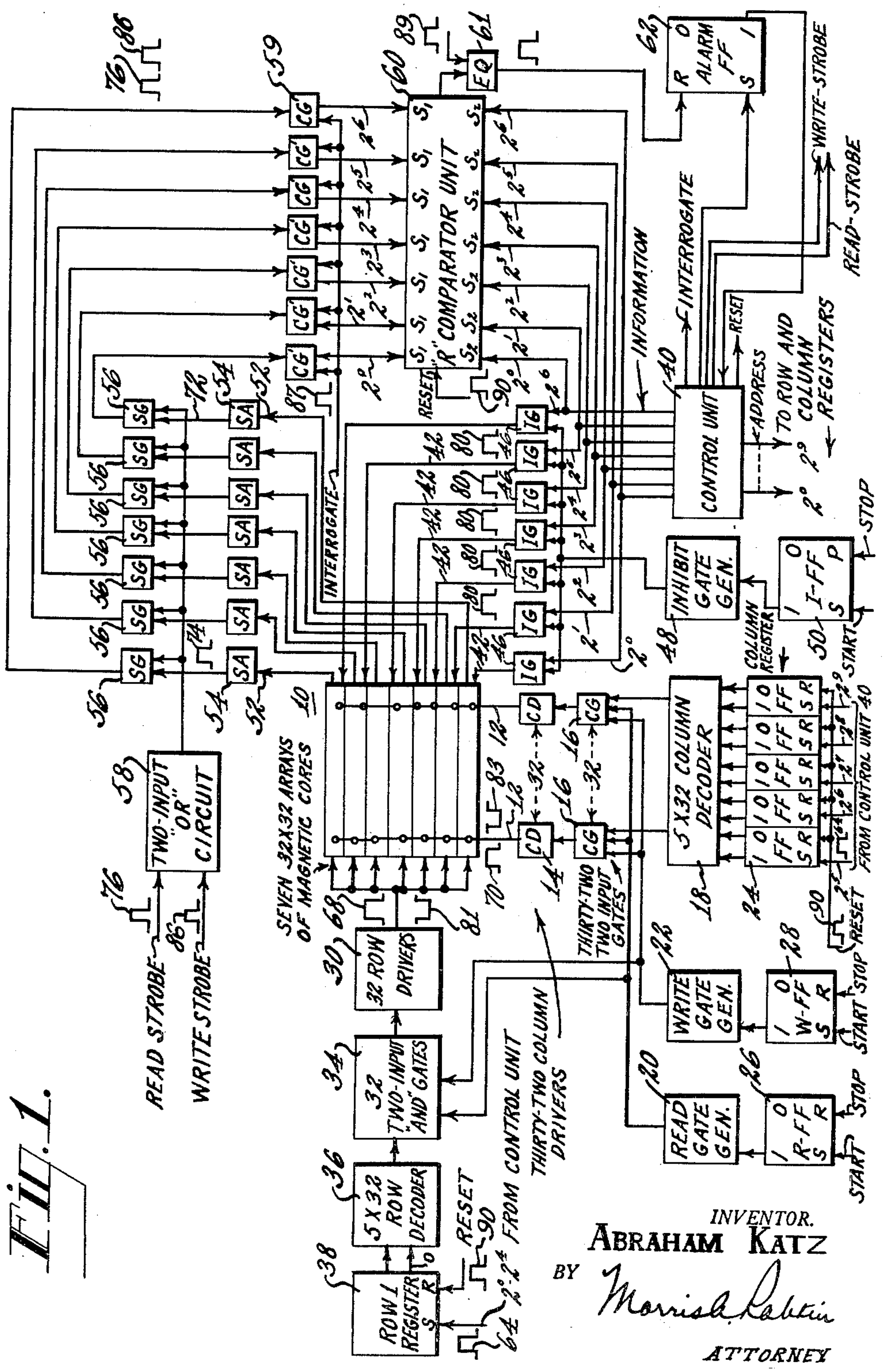
FIG. 1 is a schematic diagram of a memory system according to the invention, including a three-dimensional array of magnetic cores.

The exemplary memory system of FIG. 1 includes a memory array 10 having seven 32 x 32 arrays of magnetic cores. The memory array 10 is shown in top view for convenience of drawing, and only the end two of the thirty-two separate column windings 12 of the top array are shown. Each of the column windings 12 is connected to an output of a different one of thirty-two separate column drivers (CD) 14. The arrangement of the memory 10 and its associated equipment for selecting a desired memory address is similar to the 64 x 64 x 17 memory and the selecting equipment described in the aforementioned Papian article, except that the number of driver tubes and their associated equipment is reduced in relation to the smaller 32 x 32 x 7 memory of FIG. 1.

Figure 3:
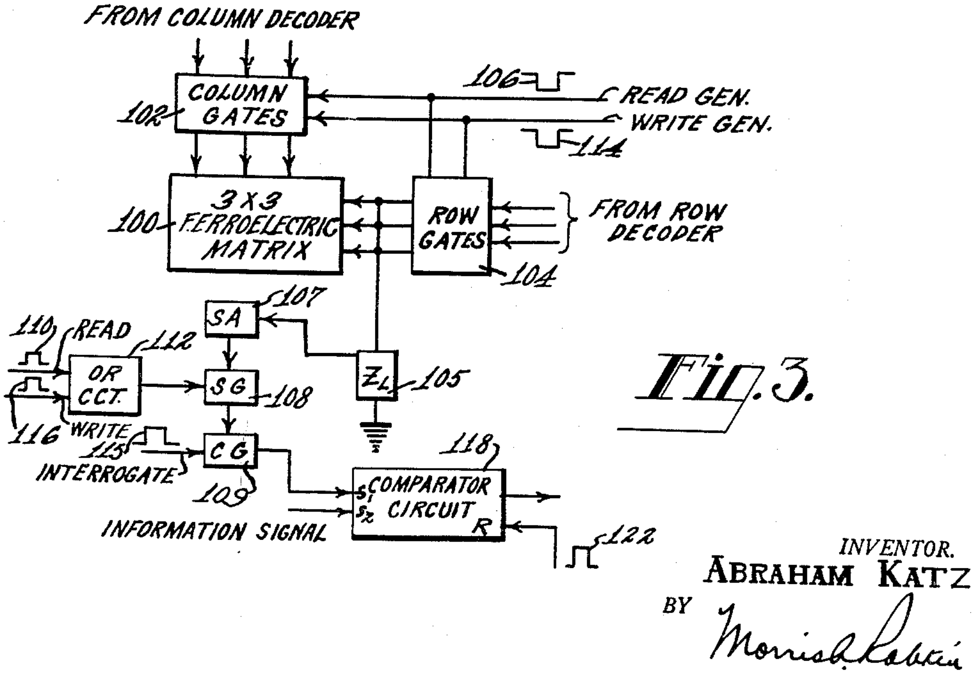
FIG. 3 is a schematic diagram of a memory system according to the invention, using ferroelectric elements.

Each of the column drivers 14 may be a pulse-transformer circuit as shown in FIGS. 1 and 3 of the Papian article. The primary winding of any one pulse transformer is center-tapped and has its two end terminals connected respectively to the two anodes of a duo-triode tube. A different column gate (CG) 16 is provided for each different column driver 14 and includes a different one of these duo-triode tubes. Each of the column windings 12 of the memory is connected across the secondary winding of a pulse transformer of a different column driver 14. The control electrodes of the thirty-two duo-triode tubes of the column gates 16 are respectively controlled by the thirty-two outputs of a 5 x 32 column-decoder matrix 18. The cathode of the other side of each of the duo-triode tubes of the column gates 16 is controlled by the output of a write-gate generator 22.

The column decoder 18 may be, for example, a crystal-diode matrix one of whose outputs is selected in accordance with five binary inputs of the matrix, in known fashion. A crystal-diode decoder arrangement is described in chapter 4 of "High-Speed Computing Devices," published by McGraw-Hill Book Company, Inc., 1950.

The five pairs of inputs of the column decoder 18 are respectively supplied by the five pairs of outputs "1" and "0" of the five flip-flop circuits of a column register 24. A flip-flop is a circuit having two stable states and having two inputs and two corresponding outputs. The inputs are designated as set "S" and reset "R," and the corresponding outputs are designated as "1" and "0." In the set state the "1" output is high relative to the "0" output, the vice versa in the reset state. The circuit remains in either state until caused to change to the other state by application of a suitable signal. A signal applied to the reset input "R" changes the circuit from the set to the reset state, and a signal applied to the set input "S" changes the circuit from the reset to the set state. These flip-flop circuits are well-known in the art.

The read-gate generator 20 is activated by the "1" output of a read flip-flop (RFF) 26, and the write-gate generator 22 is activated by the "1" output of a write flip-flop (WFF) 28. A corresponding row in each of the seven 32 x 32 memory arrays is activated by the output of one of thirty-two row drivers 30. Each of the row drivers 30 is arranged similarly to the column drivers 14. The thirty-two row drivers 30 are controlled by the outputs of thirty-two, two-input "and" gates 34, each similar to one of the column gates 16. The control grids of separate ones of the thirty-two row gates 34 are controlled by separate ones of the thirty-two outputs of a row-decoder matrix 36. The row decoder 36 is arranged similarly to the column decoder 18. The cathode of one side of each of the duo-triode tubes of the row "and" gates 34 is controlled by the "1" output of the read-gate generator 20; the cathode of the other side of each of the duo-triode tubes of the row "and" gates 34 is controlled by the "1" output of the write-gate generator 22. A desired one of the thirty-two outputs of the row decoder 36 is selected in accordance with five binary inputs applied to the five pairs of inputs of the row decoder 36. The five pairs of inputs of the row decoder 36 are respectively supplied by the five pairs of outputs "1" and "0" of the five flip-flop circuits of a row register 38. A single letter "S" is used to represent all five set inputs of the row register 38. The five set inputs "S" of the row register 38 are respectively controlled by the $2^0$–$2^4$ binary address digits supplied by a control unit 40, described more fully hereinafter. The five set inputs "S" of the column register 24 are respectively controlled by the $2^5$–$2^9$ address digits also supplied by the control unit 40. Ten binary digits are sufficient to designate any one of the 1024 individual registers of the memory array 10.

All the memory cores in the separate ones of the seven 32 x 32 arrays are linked by a separate one of seven inhibit windings 42. Each of the inhibit windings 42 is connected to the output of a different one of the seven inhibit gates (IG) 46. Each of the inhibit gates 46 may be a duo-triode gating tube. The inhibit windings 42 are respectively connected in parallel to the anodes of the gating tubes 46. The two control grids of separate ones of the inhibit gates 46 are controlled by separate ones of the binary information outputs of the control unit 40 and designated $2^0$–$2^6$ respectively. These seven outputs represent the information which is desired to be written into corresponding cores in the different memory arrays. The cathodes of all the inhibit gates 46 are controlled by the output of an inhibit-gate generator 48. The inhibit-gate generator 48 is controlled by the "1" output of an inhibit flip-flop (IFF) 50.

A different one of seven sensing windings 52 is linked to all the memory cores in each of the seven separate memory arrays. Each of the sensing windings 52 is coupled to a different one of seven sensing amplifiers (SA) 54. The sensing amplifiers 54 may be similar to the sensing amplifier described in connection with FIG. 4 of the aforementioned Papian article. Each different one of the seven sensing gates 56 has a first of its inputs enabled by the output of a different one of the sensing amplifiers 54. Each of the sensing gates 56 may be a two-input "and" gate circuit. An "and" gate is a circuit which has an output and a plurality of inputs so arranged that the output is energized only when all the inputs are present at the same time. Each of these two-input "and" gate circuits may be a diode gating circuit such as described in chapter 4 of "High-Speed Computing Devices," referred to above. The second inputs of all the sensing gates 56 are activated by the output of a two-input "or" circuit 58 which has as one input a read-strobe signal, and which has as its other input a write-strobe signal. The read-strobe and the write-strobe signals are supplied by the control unit 40. An "or" circuit has an output and a plurality of inputs so arranged that the output is energized when any one or more inputs are energized. Suitable "or" circuits are described in chapter 4 of "High-Speed Computing Devices," referred to above.

The seven separate outputs of the seven sensing gates 56 are respectively applied to first inputs of seven two-input comparator gates (CG′) 59. The comparator gates 59 are two-input "and" gates which are similar to the sensing gates 56. The second inputs of all the comparator gates 59 are enabled by an interrogation signal supplied by the control unit 40. The seven outputs of the comparator gates 59 are applied respectively to the set inputs "S" of a first set of seven flip-flops of a comparator unit 60. The comparator unit 60 may be similar to the comparator described in connection with FIG. 3 of Patent No. 2,615,127, entitled "Electronic Comparator Device," issued to R. A. Edwards on October 21, 1952. The comparator unit 60 of FIG. 1 is provided with three additional stages, a total of seven stages, each similar to any one of the four stages described by Edwards. Each stage is controlled by a different pair of flip-flop circuits. A first flip-flop of each pair has its set input "$S_1$" connected to the output of a corresponding one of the comparator gates 59. The second flip-flop of each pair receives at its set input "$S_2$" a corresponding one of the information signals $2^0$–$2^6$ supplied by the control unit 40. All the flip-flops of the comparator 60 are reset by a reset signal supplied by the control unit 40. The output of the comparator 60 is taken from a common plate resistor, as in the Edwards comparator device. When both flip-flops of each individual pair are in the same state, i.e., both set or both reset, the comparator 60 furnishes a relatively high output signal which is applied to a first input of a two-input equality "and" gate (EQ) 61. A reset alarm signal, generated by the control unit 40, is applied to the second input of the equality gate 61. The output of the equality gate 61 is connected to the reset input "R" of an alarm flip-flop 62. When the two flip-flops of any pair of comparator flip-flops are in different states, a relatively low output signal is furnished by the comparator unit 60 and the reset signal for the alarm flip-flop is blocked. A signal is applied to the set input "S" of the alarm flip-flop 62 by the control unit 40. The "1" output of the alarm flip-flop 62 is applied to the control unit 40 as an indication of the correctness of the information actually written into the desired cores of the memory 10. A reset signal from the control unit 40 is used for resetting the flip-flops of the column register 24 and the row register 38, the control unit 40 may be any suitable device, for example, an electronic digital computer, arranged for furnishing the various signals used in the memory system.

During the read operation, application of a positive row-read pulse 68 and a positive column read pulse 70 to the row and column windings of a core provides sufficient magnetizing force to change the core to one of its two states, say positive. Each of the group of seven aligned cores that are located in corresponding positions in the seven 32 x 32 arrays receives a row-read pulse 68 and a column read pulse 70 at the same time. Each different group of seven cores is specified by a different memory address. The information stored in the cores at the given address is detected by the seven sensing amplifiers 54 which are responsive to the signals induced in the sensing windings 52. When a core is already in the positive state, the read pulses 68 and 70 produce a relatively small flux change in the core; hence, a relatively small voltage is induced in its sensing winding 52. The sensing amplifier 54, connected to this sensing winding 52, does not furnish any output signal or, at most, a relatively small output signal. When a core is in the negative state, the read pulses 68 and 70 produce a relatively large flux change in the core; hence a relatively large voltage is induced in its sensing winding 52. The sensing amplifier 54, connected to this sensing winding, amplifies this signal. Now, if the positive and the negative states of a core respectively represent the binary digits "0" and "1," the information stored in a specified memory address is represented by outputs of the respective sensing amplifiers 54. The large output signal of a sensing amplifier 54 enables one input of its connected sensing gate 56, and this sensing gate then passes a read-strobe pulse 76 which is applied to its second input through the two-input "or" circuit 58. The small output signal of a sensing amplifier 54 is insufficient to enable its connected sensing gate 56, and the read-strobe pulse 76 is blocked by this sensing gate 56. The pattern of outputs of the seven sensing gates 56 now represents the information originally stored in the specified memory address. The pattern of output signals from the sensing gates 56 may be used for any desired purpose, not pertinent here. The outputs of the sensing gates 56 also are applied to the respective comparator gates 59, but these gates are not enabled during the read portion of the memory cycle.

Figure 2:
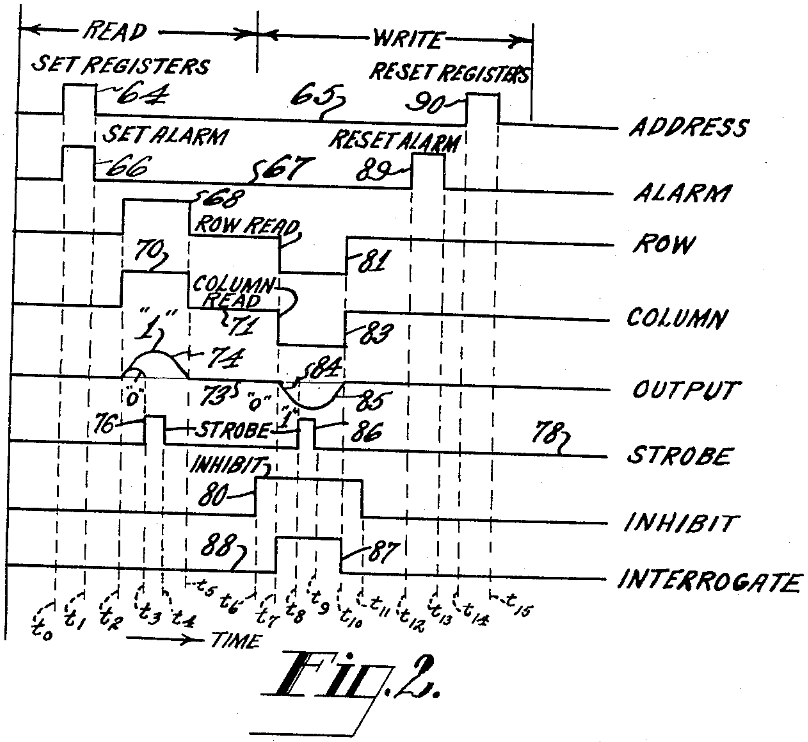
FIG. 2 is a timing diagram useful in explaining the operation of the system of FIG. 1.

The waveforms of FIG. 2 show the relative timing of the various pulses used during the operation of the system. The single setting pulse 64 of the setting waveform 65 represents the set of signals $2^0$–$2^9$ applied to the row and column registers 38 and 24 which specify the desired memory address. The binary signals $2^0$–$2^4$ specify the row of the desired address and the binary signals $2^5$–$2^9$ specify the column of the desired address. These address signals are applied to the respective set inputs "S" of the row and the column registers 38 and 24 by the control unit 40 during the times $t_0$–$t_1$. At the same time, a setting signal, indicated by the pulse 66 of the alarm waveform 67, is applied to the set input "S" of the alarm flip-flop 62 by the control unit 40. The outputs of the row register 38 operate to raise the voltage level of one output of the row decoder 36 which level enables the control grids of one duo-triode tube of the row "and" gates 34. The outputs of the column register 24 operate to raise the voltage level of one output of the column decoder 18 which level enables the control grids of one duo-triode of the column "and" gates 16.

At time $t_2$, the control unit 40 applies a start signal to the read flip-flop 26, thereby operating the read-gate generator 20. The read-gate generator 20 operates the one row driver 30 and the one column driver 14 that are respectively connected to the enabled row and column "and" gates 34 and 16. The operated ones of the row and column drivers 30 and 14 apply the respective row and column read pulses 68 and 70 to the row and column windings of the memory cores located at the desired memory address. The row and column read pulses are indicated in FIG. 2 by the pulses 68 and 70 of the row and column waveforms 69 and 70. The output signal 74 of the output waveform 73 is produced by a sensing amplifier 54 that receives a relatively large signal at its input during read time. This signal, for example, represents a binary "1." The relatively small output signal 72 of the output waveform 73 is produced by a sensing amplifier 54 that receives a relatively small signal at its input. This signal represents, for example, a binary "0." Note that the binary "0" signal terminates at time $t_3$ while the binary "1" signal continues to $t_5$.

The read-strobe pulse 76 of the strobe waveform 78 is generated by the control unit 40 and is applied to all the sensing gates 56 during the times $t_3$ to $t_4$. This timing insures that only the sensing gates 56 that are enabled by the binary "1" signal produce any output signal.

At time $t_5$, the row and column-read pulses 68 and 70 are terminated when the control unit 40 applies a stop signal to reset the read flip-flop 26. Note that after the read part of the cycle is ended, all the memory cores located at the specified address are in the positive state.

During the write portion of the cycle, the information desired to be written into the memory cores at the desired address is specified by the binary information digits $2^0$–$2^6$. These signals are appiled by the control unit 40 to the respective inhibit gates 46. A binary "0" digit is used to enable a corresponding inhibit gate 46. At time $t_6$ the control unit 40 applies a start signal to the inhibit flip-flop 50. The "1" output of the inhibit flip-flop 50 operates the inhibit gate generator 48. The inhibit gate generator 48 generates an inhibit pulse 80 which is passed by each enabled inhibit gate 46 to its connected inhibit winding 42. A typical inhibit pulse is shown by the pulse 80 of the inhibit waveform of FIG. 2.

At time $t_7$ the control unit 40 applies a start signal to the write flip-flop 28 which operates the write gate generator 22. The write gate generator operates each previously enabled "and" gate of the row and column "and" gates 34 and 16. The one row driver 30 connected to the enabled row gate 34 produces a negative row write pulse 81; and the one-column driver 14 connected to the one enabled column gate 16 produces a negative column write pulse 83. The row write pulse is indicated in FIG. 2 by the negative pulse 81 of the row waveform 69, and the column write pulse 83 is indicated by the negative pulse 83 of the column waveform 71. The output signal 85 of the output waveform 73 is produced by a sensing amplifier 54 that receives a relatively large signal at its input during write time. A large signal represents a binary "1" because each inhibit pulse 80 holds the memory core receiving it in the initial positive state representing a binary "0." Thus, only those cores that are changed to the negative state produce a large signal 85 in their sensing windings 52. The output signal 84 of the output waveform 73 is produced by a sensing amplifier 54 that receives a relatively small signal induced in the sensing windings 52 of those cores that are held in the positive state by the inhibit pulses 80. This relatively small signal then represents a binary "0."

Between the times $t_8$ and $t_9$ the control unit 40 generates a write-strobe pulse 86 which is passed by the "or" circuit 58 to the second inputs of all the sensing gates 56. Those sensing gates 56 that are enabled by the relatively large output signal from a sensing amplifier 54 pass the write-strobe pulse 86 to the first input of a corresponding comparator gate 59. The pattern of output signals from the sensing gates 56 thus represents the information actually written into the memory cores at the specified address.

Between the times $t_7$ and $t_{10}$ the control unit 40 generates an interrogation pulse 87 which is used to enable all the comparator gates 59. The interrogation pulse is indicated in FIG. 2 by the pulse 87 of the interrogation waveform 88. Thus, each comparator gate 59 receiving a signal from one of the sensing gates 56 applies an output signal to the set input $S_1$ of one of the first set of seven flip-flops of the comparator unit 60. Thus, a binary "1" is indicated when a flip-flop of the first set is changed to its set condition by the output of a comparator gate 59. The $2^0$–$2^6$ information signals from the control unit 40 are applied to the set inputs $S_2$ of the second set of seven flip-flops of the comparator unit 60. Thus, all the flip-flops of the second set are changed to their set condition except those indicating a binary "0" signal. The comparator unit 60 compares the information actually written into the memory cores, as sensed by the sensing amplifiers 54 and the sensing gates 56, with the information desired to be written into the memory cores. The comparator unit 60 supplies a relatively large output signal only when both sets of flip-flops are storing the same information. This output signal is used to enable the equality gate 61.

At time $t_{10}$ the control unit 40 applies a signal to the stop input of the write flip-flop 28 to terminate the row and column write pulses 81 and 83. At times $t_{11}$ the control unit 40 applies a signal to the stop input of the inhibit flip-flop 50 to terminate the inhibit pulse 80.

Between the times $t_{12}$ and $t_{13}$, the control unit 40 generates an alarm pulse 89 which is applied to the second input of the equality gate 61. If the equality gate 61 is enabled by the output of the comparator unit 60, the alarm pulse 89 is passed to the reset input "R" of the alarm flip-flop 62. If the equality gate 61 is not enabled, the alarm pulse 89 is blocked and the alarm flip-flop 62 remains in its set condition. The alarm pulse 89 is indicated in FIG. 2 by the pulse 89 of the alarm waveform 67.

Accordingly, the correctness of the information actually written is established in a positive manner by the "1" output of the alarm flip-flop 62. A relatively high level "1" output, for example, may be used to operate suitable circuitry to shut down the system. Alternatively, the "1" output may be used to generate another memory cycle to again attempt to write the same information in the desired address.

During the times $t_{14}$ and $t_{15}$, a reset pulse 90 is generated by the control unit 40. The reset pulse 90 is applied to all the reset inputs "R" of the row and column registers 38 and 24. The reset pulse is indicated in FIG. 2 by the positive pulse 90 of the address waveform 65. The reset pulse 90 is also applied to all the reset inputs "R" of the first and second sets of seven flip-flops of the comparator unit 60.

Information may be read from, and written into, the same or a different memory address by operating the control unit 40 to produce another memory cycle. The accuracy of the information written into the memory is assured at all times in positive fashion.

The principle of the invention also may be applied to memory systems using ferroelectric elements, as illustrated in the schematic diagram of FIG. 3. The ferroelectric elements may be arranged in a two-dimensional array 100 in the manner illustrated for the 3 x 3 array of FIG. 16 of the aforementioned Pulvari article. The separate columns of the ferroelectric elements of the array 100 are controlled by the column gates 102, and the separate rows of ferroelectric elements of the array 100 are controlled by the row gates 104. The information written into the read out of a desired one of the ferroelectric elements of the array 100 is indicated by a current surge appearing across a common impedance element 105 (ZL). The impedance element 105 may be a pulse transformer common to all the elements of the array, as described in the above Pulvari article. One of the column gates 102 and one of the row gates 104, whose outputs are respectively coupled to the two plates of the desired ferroelectric element of the array 100, are enabled at any one time by suitable circuitry, for example a suitable decoder matrix similar to that described for the embodiment of FIG. 1 herein.

A control unit, such as the control unit 40 of FIG. 2 herein, may be used for generating the various pulses used during the reading and writing operations. A read pulse 106 is then applied by any suitable read generator to all of the column gates 102 and all of the row gates 104. The read pulse 106 is passed by the enabled ones of the row and column gates to the desired ferroelectric element of the array 100.

When the desired ferroelectric element changes its remanent state, a surge of current appears across the primary winding of the transformer 105. The signal induced in the secondary winding of the transformer 105 is applied to the input of a sensing amplifier 107. The sensing amplifier 107 may be similar to any one of the sensing amplifiers 54, described in connection with FIG. 1 herein. The output of the sensing amplifier 107 is applied to one of the inputs of a two-input sensing gate (SG) 108. During the time interval, when the ferroelectric element is changing state in the read operation, a read-strobe pulse 110 is passed through a two-input "or" circuit 112 to the second input of the sensing gate 108. The presence of a read pulse 110 and an output signal from the sensing amplifier 107 activate the sensing gate 108 which then furnishes an output signal. The output signal of the sensing gate 108 is applied to one of the inputs of a two-input comparator "and" gate (CG) 109. The comparator gate 109 is not activated during the read operation. If no change of state is produced in the ferroelectric element by the read signal 106 applied to the array 100, then the sensing amplifier 107 has a relatively small output signal and the sensing gate 108 is not activated. The output of the sensing gate 108 also may be used for other purposes.

After the read operation is terminated, information is written into a desired one of the ferroelectric elements of the array 100 by applying, or not applying, a write pulse 114 to each of the column gates 102 and to each of the row gates 104. When a write pulse 114 is applied, the enabled ones of the row and column gates apply signals which change the desired element from its initial remanent state to the other remanent state. Thus, one of the binary digits, for example the binary "0" digit, may be represented by the initial state of the desired element and the binary "1" digit represented by the other state of the element. An interrogate pulse 115 also is generated at the same time as the write pulse 114 and is applied to the second input of the comparator gate 109. The comparator gate 109 is thus enabled during the write operation. The output produced across the impedance element 105, when the ferroelectric element changes state, is amplified by the sensing amplifier 106 and applied to the sensing gate 108. A write-strobe pulse 116 is generated during the write operation and is passed through the "or" gate 112 and the enabled sensing gate 108 to the first input of the comparator gate 109. The comparator gate 109 then furnishes an output to the $S_1$ input of a suitable comparator circuit 118. The information desired to be written into the ferro-electric cell is also applied to the $S_2$ input of the comparator circuit 118. The comparator circuit 118 then operates to compare the two signals and furnishes an output signal on its output lead 120 indicating the correspondence or the non-correspondence of the compared signals. A reset signal 122 is used to reset the comparator flip-flops prior to each read-write operation.

There has been described herein an improved memory system which furnishes a positive indication during the storage operation of the information actually stored in memory elements. The present invention makes use of the fact that these memory elements have their remanent states changed during the process of storing information and that these changes of state can be monitored to assure correctness of the stored information.

What is claimed is:

1. The combination of a memory system having a plurality of sets of elements having stable remanent states, each set arranged in rows and columns, means for writing information represented by signals into a desired element only in each of said plurality of sets of elements by coincident excitation of a corresponding selected row and a corresponding selected column in each of said desired sets, said information being represented by the remanent states of said desired elements, and a different sensing means for each of said sets of elements, said sensing means providing signals during reading indicative of the remanent state of a corresponding element in respective said sets, said sensing means also respectively furnishing signals during said writing indicative of the information written into said desired elements, with a comparison circuit for receiving and comparing said information representing signals and said sensing means signals, said comparison circuit furnishing an indicaton of the correspondence or non-correspondence of said compared signals.

2. The combination of a coincident excitation memory system having a plurality of multistable elements in sets, the elements of each set being arranged in rows and columns, and means for storing information transmitted in pulse form in desired ones of said elements in different ones of said sets, said system also having means for selection of a desired row and a desired column in each set in response to an information pulse for causing a desired one of said elements to assume a selected one of its stable states, with a plurality of sensing means each responsive to a change in state of any element in a different one of said sets as a result of a different one of the transmitted information pulses for producing, while said information pulses are present, an output pulse representing information stored in said one desired element in any set, a comparison circuit, means for transmitting said information and said sensing means pulses to said comparison circuit, said comparison circuit furnishing a signal indicating the correspondence or non-correspondence between the information pulses and said sensing means pulses.

3. In a memory system, the combination as claimed in claim 2, wherein each of said elements is a core of magnetic material having a substantially rectangular hysteresis loop.

4. In a memory system, the combination as claimed in claim 2, wherein each of said elements is a ferroelectric cell.

5. The combination of a coincident excitation memory system having a plurality of bistable elements and having means for writing information into a desired one and none other of said elements by exciting a selected row and a selected column to establish said desired element in a desired one of its two states under the control of an information signal and further having a reading means comprising means for registering information read out of said memory, a sensing means coupled to all of said elements for deriving a sensing signal in response to a change of state of any selected element, and means registering said sensing signal in said registering means during the reading of information out of said memory and for preventing the registering of sensing signals in said registering means when not reading information out of said memory, with a monitoring system for determining the information written into said desired element, said monitoring system comprising said sensing means and providing, while said information signal is present, a signal indicative of the state in which said element is established by said information signal, comparing means having an output and inputs for comparing signals received at said inputs and for generating an output signal in response to an identity between said received signals, means coupling said sensing means signals to one of said comparator inputs during said writing, and means for applying said information signals to another of said comparator inputs.

6. An information storage system comprising a plurality of individual storage elements in a row and column relationship each of said elements having two stable, remanent states and having a substantially rectangular hysteresis characteristic, means for writing information into a selected element by applying excitation to a selected row and a selected column sufficient to change only said selected element to a desired one of said states, sensing means for sensing a change of state of said element during said writing, and means including said sensing means for monitoring information as it is being written into said selected element, and means for reading information out of said memory including said sensing means.

7. A memory system as claimed in claim 6, wherein said elements are magnetic-core elements and said sensing means includes a winding coupled to all of said cores.

8. A memory system as claimed in claim 6, wherein said elements are ferroelectric elements.

References Cited in the file of this patent

UNITED STATES PATENTS

| | | |
|---|---|---|
| 2,695,396 | Anderson | Nov. 23, 1954 |
| 2,695,397 | Anderson | Nov. 23, 1954 |
| 2,695,398 | Anderson | Nov. 23, 1954 |
| 2,700,148 | McGuigan et al. | Jan. 18, 1955 |
| 2,717,373 | Anderson | Sept. 6, 1955 |
| 2,774,056 | Stafford | Dec. 11, 1956 |
| 2,776,419 | Rajchman et al. | Jan. 1, 1957 |
| 2,808,578 | Goodell et al. | Oct. 1, 1957 |